Nov. 10, 1942. E. K. CARVER 2,301,368
MANUFACTURE OF VINYL RESIN FILM AND SHEETING
Filed Dec. 9, 1939
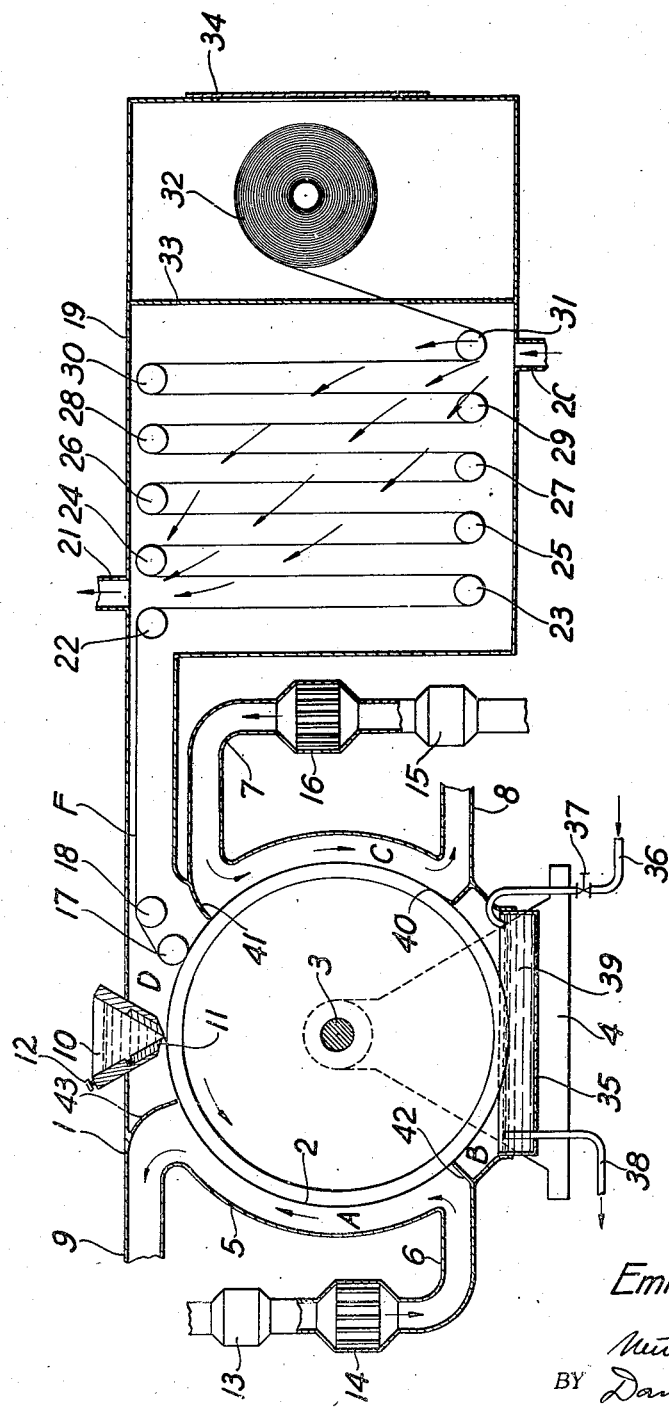
Emmett K. Carver
INVENTOR
BY
ATTORNEYS Patented Nov. 10, 1942

2,301,368

UNITED STATES PATENT OFFICE 2,301,368

MANUFACTURE OF VINYL RESIN FILM AND SHEETING

Emmett K. Carver, Rochester, N. Y., assignor to Eastman Kodak Company, Rochester, N. Y., a corporation of New Jersey Application December 9, 1939, Serial No. 308,499

2 Claims. (Cl. 18—57)

This invention relates to the production of film, sheeting, and other attenuated products from vinyl resins, and more particularly to a method of facilitating the removal of such products from surfaces upon which they have been formed.

In recent years, research carried on in connection with the production and use of vinyl resins has demonstrated that certain of these materials, particularly the acetals derived by condensing various aldehydes with polyvinyl alcohols or partially hydrolyzed polyvinyl esters may be employed satisfactorily in the manufacture of photographic film base, sheeting and other attenuated products. In general, it may be said that such resins are susceptible of being cast or extruded by a procedure analogous to that employed in the manufacture of film and sheeting from cellulose derivatives. However, due to their peculiar physical and chemical characteristics, particularly their inherent tendency to adhere to surfaces upon which they are cast from solution and their tendency to stretch when subjected to relatively slight tension at moderately elevated temperatures, many unusual and difficult problems are encountered when one attempts to apply known film-forming technique as practiced in the cellulose derivative industry to these resinous materials.

One of the most serious problems encountered in the manufacture of these resin films and sheeting by the customary wheel casting method is to bring the cast layer of resin into such a condition that it can be satisfactorily stripped from the film-forming surface. Vinyl resin films and sheeting are particularly difficult to strip without injury to the product. In the first place, under moderately elevated temperature the material tends to adhere more firmly to the casting surface, particularly if the surface is of metal, and thus requires considerably more tension for its removal than is the case with cellulose derivatives. In the second place, this tension must be applied at a time when the resin layer contains a fairly considerable amount of solvent and is thus very elastic and in a particularly stretchy condition. The degree of stretch is also much higher in such films than in the case of the cellulose derivatives. For example, whereas a cellulose derivative film will be stretched, under ordinary circumstances, only a few per cent at stripping, a vinyl resin film, on the other hand, may stretch several hundred percent under the same or comparable conditions. Not only does this excessive stretch present many difficulties in the handling of the material during the subsequent curing operations, but it also has a tendency to adversely affect the quality of the finished product.

This invention has as its principal object to provide a method of manufacturing vinyl resin films, particularly those of the acetal type, in which the film is brought to a condition in which it may be satisfactorily stripped from its film-forming surface under substantially the same conditions of temperature and tension as are now customarily employed in processes for the manufacture of film and sheeting from cellulose derivative materials. Another object is to provide a means of facilitating the removal of vinyl resin films or sheets from a film-forming surface and under minimum tension. A further object is to provide a method of making vinyl resin film and sheeting in which the material is not subjected to excessive stretching at the point of stripping. Other objects will appear hereinafter.

These objects are accomplished by the following invention, which, in its broader aspects, comprises the deposition of a solution of an appropriate vinyl or other synthetic resin on the surface of a slowly rotating wheel or drum, partially removing solvents from the deposited material, subjecting the material after this partial solvent removal to the action of water or other appropriate non-solvent liquid by submerging the film for a portion of its revolution on the wheel in a body of the liquid, then curing out further residual solvent by an air treatment and finally stripping the resin film or sheeting material from the film-forming surface under minimum tension and at a moderately elevated temperature. The distinguishing feature of my invention is the application of liquid water or other non-solvent liquid to the film, preferably at an intermediate stage of the curing operation on the wheel. I have found that liquid water when applied in this manner has a peculiar and unexpected effect on the vinyl resin film material, namely, it almost instantaneously overcomes its inherent tendency to stick to the wheel surface, and in fact, brings the film into a condition in which it will practically float from the wheel at the normal point of stripping. It may also be easily removed from the wheel surface before the film emerges from the liquid. Thus stripping may be accomplished either at the normal stripping point, which is generally after the casting wheel has gone through about ⅘ or more of a revolution, or at the lowermost point of the wheel's travel. This is a result which is utterly out of the question when using customary film-forming technique.

In the following examples and description, I have set forth several of the preferred embodiments of my invention, but they are included merely for purposes of illustration and are not to be regarded as limitations thereof.

The single figure of the drawing is a diagrammatic sectional elevation of one type of apparatus by which my invention may be carried out.

The numeral 1 designates a conventional type of film-forming apparatus comprising the casting or coating wheel 2 mounted in suitable bearings 3. The wheel assembly is mounted on base 4, and is surrounded by wheel casing 5 which is provided with air inlet conduits 6 and 7 and air outlet conduits 8 and 9.

The numeral 10 designates a conventional type of dope hopper provided with adjustable gate member 11 for regulating the thickness of the dope stream which flows therefrom, adjustment being by means of thumb screw 12 attached in known manner to the gate member and threaded through one wall of the hopper.

Inlet conduit 6 is preferably provided with air filter 13 and heater 14 for purifying and raising the temperature of the current of curing air to which the film is first subjected.

Likewise, air inlet conduit 7 is provided with air filter 15 and heater 16 for the purpose of purifying and heating the air which is intended to accomplish the final stage of curing before the film is stripped from the wheel. Circulation of the heated air through inlet conduits 6 and 7, respectively, and outlet conduits 8 and 9, respectively, is accomplished by means of an appropriate air purifying and circulating device (not shown) connected in appropriate manner to the conduits, the solvent laden air from the two parts of the wheel casing being passed to a suitable common solvent recovery system (not shown).

Numeral 17 designates a stripping roll to facilitate removal from the wheel surface of the solidified film F. Likewise guide roll 18 facilitates passage of the film F to a conventional drying chamber 19. This chamber is provided with air inlet conduit 20 and air outlet conduit 21 and with a series of rolls 22, 23, etc., over which the film passes on its way to the wind-up 32. If desired, the wind-up may be positioned in a separate chamber from the main curing chamber, this chamber being separated therefrom by means of partition 33. Removal of the finished product is facilitated by means of a hinged door 34.

Numeral 35 designates a tank or other suitable container located at the lowermost point of travel of the wheel 2 and is provided with a suitable water supply inlet conduit 36 controlled by valve 37 as well as with overflow conduit 38. The level of the liquid 39 may be automatically adjusted or controlled by an appropriate constant level device (not shown) which may be connected in known manner to operate valve 37.

Numerals 40, 41, 42, 43 designate baffles which serve to divide the wheel casing into four separate sections or compartments A, B, C and D. In sections A and C, there is a circulation of heated air as shown. Sections B and D, on the other hand, are substantially quiescent.

The tank 35 is so positioned at the lowermost point of travel of wheel 2 and the liquid level therein is kept at such a height that the casting wheel dips in, and the film is actually submerged in, the water for a brief period of its treatment on the wheel.

The operation of the apparatus will be apparent on inspection. As the wheel 2 rotates slowly in the direction indicated by the arrow, a suitable dope composed of an appropriate vinyl resin dissolved in a volatile solvent or solvent combination is fed from the hopper 10 to the surface of the wheel. The thickness of the dope stream is regulated by adjustment of the gate member 11 to give a film of appropriate eventual thickness, say of the order of .005".

The film passes countercurrently to a current of filtered warm air passing into the apparatus from the inlet conduit 6 and out by means of conduit 9. As shown, the wheel casing is divided into a plurality of sections, or compartments, the first section A being for preliminary air curing by means of the air current just referred to. The second section B is provided chiefly for the purpose of submerging the film in water in accordance with the invention. The third section C is arranged similarly to the first to provide the final stage of air curing before the film is stripped from wheel 2 at stripping roll 17 in section D. Section C is provided with inlet conduit 7 through which passes filtered heated air, the current of air passing as before countercurrently to the film and finally being led away from the apparatus by means of conduit 8 as previously described.

The casting wheel is heated to a temperature by heat acquired from the two currents of air passing through sections A and C of the wheel casing, sufficient to facilitate evaporation of solvents from the film, but not high enough to have any deleterious action thereon. The actual temperature employed will depend, not only upon the particular resin employed in the dope, but also upon the boiling point of the solvent or solvents employed. The practical upper limit of temperature will be somewhat below the boiling point of the solvent, since if the temperature were raised to or above the boiling point, the solvent would bubble and thus produce defects in the body of the film material. Depending upon the type of film material being treated and various other factors, the wheel itself may be internally heated, if desired, although this is generally to be avoided because of the tendency of the resinous material to become more adherent under the influence of heat.

As soon as the film encounters the current of air passing through the first section or compartment, it begins to set or harden by loss of solvent and as this setting action continues, to cling more and more tenaciously to the wheel surface. In this condition it is extremely difficult to remove from the casting surface and, under some circumstances, it may even be difficult to scrape the material mechanically therefrom.

Upon leaving the first compartment the wheel passes into the second compartment in which there is no circulation of heated air. In this compartment, in accordance with my invention, the film still clinging tenaciously to the casting surface, is carried by the wheel into and below the surface of a bath of water or other suitable non-solvent liquid which acts to break the bonding forces operating at the interface between the film and the surface.

The film then passes into a third compartment where it meets a second counter-current of warm air which serves, not only to evaporate off any surface water or non-solvent which may be clinging thereto, but also to facilitate continued removal of residual solvent from the body of the film. At this stage and, in fact, as soon as, or even before, the film leaves the water or non-solvent bath, it is found to be in a condition in which it may be readily removed from the film-forming surface. Thus, by the time it reaches stripping roll 17, there is practically no tendency for the film to cling to the surface of the wheel. It can then be stripped with minimum tension and passed into the final drying compartment where it meets a current of warm air which reduces the residual solvent to the final desired value.

It will, of course, be understood that no hard and fast rules can be laid down with respect to the conditions of my process with respect to temperatures, period of immersion of the film in the bath, the temperature of the film-forming surface, the temperature of the curing air at the various stages in which air is employed and various other details of the process, since these will vary widely with the specific synthetic resin material dealt with, the solvents employed in making up the original film-forming solution, and various other factors. Suffice it to say that the film-forming surface should be heated to a temperature sufficient to bring about a relatively rapid removal of solvents from the film material without damage thereto by overheating. As to the water bath, while I prefer to employ a water bath having a temperature approximately equal to that of the film-forming surface, this temperature may be considerably above or below this temperature. Under ordinary circumstances, I simply fill the bath with water at room temperature and let it reach an approximate temperature equilibrium with the film-forming surface.

In dealing with certain types of vinyl resin and similar synthetic resin films, I have found that the film sometimes becomes hazy, turns white or even becomes opaque under the influence of the water or non-solvent bath. This defect can easily be removed from the film by passing it between rolls heated to a moderately elevated temperature or by subjecting the film to an appropriate solvent wash. Here again, the temperature of the rolls, the particular solvents employed, and other conditions will be selected upon the basis of the particular film material dealt with.

The matter of tension to which the film is subjected at the stripping point is a matter of some importance, but no hard and fast rules can be laid down with respect to the amount of tension required, since this will also vary with the particular film material employed, the temperature, degree of curing attained in the wheel casing and various other factors. In any event, the temperature of the film-forming surface, the temperature of the curing air, and the tension applied to the film should all be coordinated in such a manner as will preclude the possibility of the film becoming unduly adherent and/or stretching. Since one is here dealing with a material which is quite different in both its physical and chemical properties from cellulose derivative films, it will at once be evident that a very special technique is required in the film manufacturing process to obtain products which are satisfactory for use as photographic film, transparent sheeting and similar purposes.

In order further to illustrate my invention, the following specific example of typical process involving the use of a specific vinyl resin composition is given.

*Example.*—A butacetal resin such as described in Talbot U. S. Patent 2,129,450, was dissolved in a solvent comprising 90 parts of acetone by weight and 10 parts of methanol by weight in a proportion of one part of resin to 3.45 parts of solvent. The filtered solution at a temperature of approximately 110° F. was flowed from a hopper of a conventional type onto the surface of a casting wheel maintained at a temperature between 90 and 95° F. Hot air was supplied to compartment A of a wheel casing such as shown in the drawing at a temperature of about 104° F. The temperature of this air as it leaves the casing was approximately 101° F. The lower portion of the wheel carrying the deposited resin film was immersed in a bath of water at a temperature of 125° F. Water of the above temperature is circulated continuously through this bath and is removed continuously. After immersion in the water-bath, the film while still upon the wheel surface, was further cured by hot air supplied from a second inlet at approximately the same temperature as the first mentioned air current. The film was then stripped from the wheel surface at a point near the upper portion of the wheel and completely cured by being passed through a suitably designed curing section through which circulated a current of air having a temperature of approximately 110° F. at the point where the green film enters the curing section, gradually increasing until the temperature of the air near the exit of the curing section may be as high as 180° F.

While I do not confine myself to any particular theory to explain the results obtained by my invention, I believe that during immersion of the film the water diffuses into and lubricates the junction between the resin material and the wheel or at least breaks the bonding forces operating in that locality. Whatever the true explanation, the fact remains that in accordance with my invention by treating a vinyl or similar synthetic resin film which normally has a pronounced tendency to adhere, I am enabled readily to remove the material from the film-forming surface without sticking, undue stretching or the production of mechanical surface defects. With the use of such an expedient and employing the ordinary film-forming technique, it is impossible satisfactorily to remove such a resin from a film-forming surface.

My invention is particularly to be distinguished from certain processes of the prior art in which cellulose derivative films are immersed in water after removal from a casting surface for the purpose of removing residual solvent, for coagulating or solidifying the film material and for other purposes. My water or non-solvent treatment is concerned primarily with facilitating the removal from the surface on which it is formed or cast from solution, of a resinous type of film which normally inherently tends to cling tenaciously to such a surface and has nothing whatever to do with solvent removal per se, nor in fact with film curing or solidification or similar treatment. Whatever curing or solidifying effects as may take place as a result of my process are purely incidental and collateral to the main inventive concept.

While my invention is designed to be applied with success to any type of synthetic resin which, when cast from solution on a film-forming surface, has a pronounced tendency to adhere strongly to such surface, it has particular value in facilitating the removal from casting surfaces of resins such as those described in the Matheson U. S. Patent 2,116,635, in Morrison et al. U. S. Reissue Patent 20,430, and Talbot Patent 2,129,-

450, in which the property of adherence is exceptionally pronounced.

It will be seen from the above, that I have provided a valuable adjunct to the method of producing vinyl and similar synthetic resin film and sheeting. In fact, my invention provides a solution for a long-standing problem in connection with the manufacture of this type of product which, unlike cellulose derivative film and sheeting, is very much more difficult to handle and especially to separate from a casting surface without mechanical defects.

What I claim is:

1. The method of making synthetic resin film and sheeting, which comprises depositing a solution of a synthetic resin in volatile solvents on a film-forming surface, removing solvents therefrom by an initial curing treatment by means of warm air, immersing the film while still on the film-forming surface in a bath of non-solvent liquid, subjecting the film to a second treatment with warm air, stripping the film from the film-forming surface under a tension just sufficient to remove the film without stretch or other mechanical defects and thereafter curing out residual solvent by means of a final air treatment.

2. The method of making vinyl resin film and sheeting which comprises depositing a solution of a vinyl resin in volatile solvents on a film-forming surface, removing solvents therefrom by an initial curing treatment by means of warm air, immersing the film while still on the film-forming surface in a bath of water, subjecting the film to a second treatment with warm air, stripping the film from the film-forming surface under a tension just sufficient to remove the film without stretch or other mechanical defects and thereafter curing out residual solvent by means of a final air treatment.

EMMETT K. CARVER.